No. 724,241. PATENTED MAR. 31, 1903.
J. G. BAKER.
CHERRY STONER.
APPLICATION FILED JULY 3, 1901.
NO MODEL. 2 SHEETS—SHEET 1.
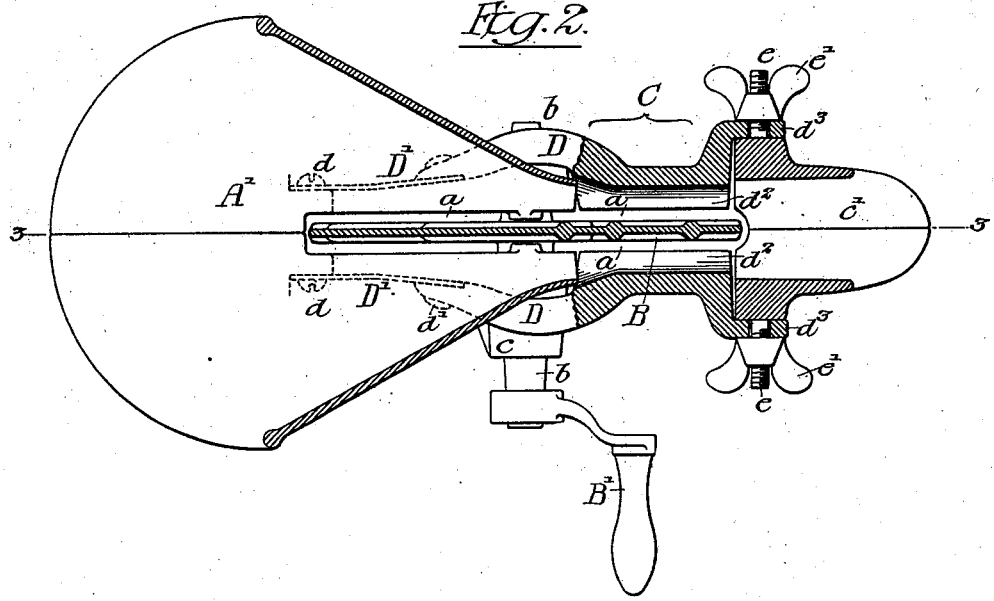
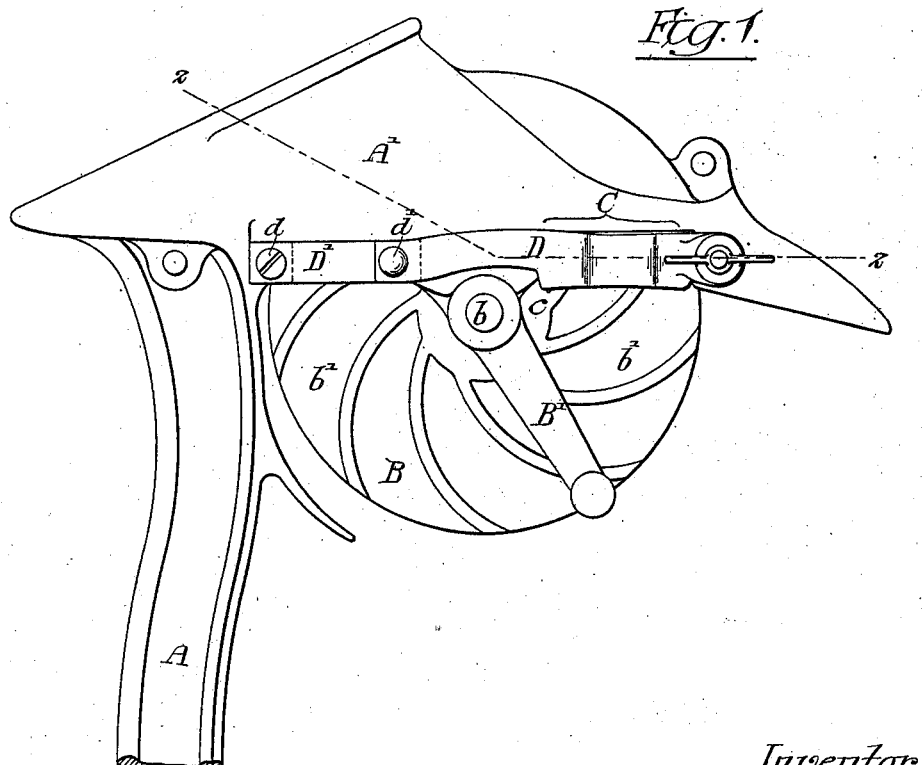
Inventor:—
John G. Baker
by his Attorneys:—

No. 724,241. PATENTED MAR. 31, 1903.
J. G. BAKER.
CHERRY STONER.
APPLICATION FILED JULY 3, 1901.
NO MODEL. 2 SHEETS—SHEET 2.
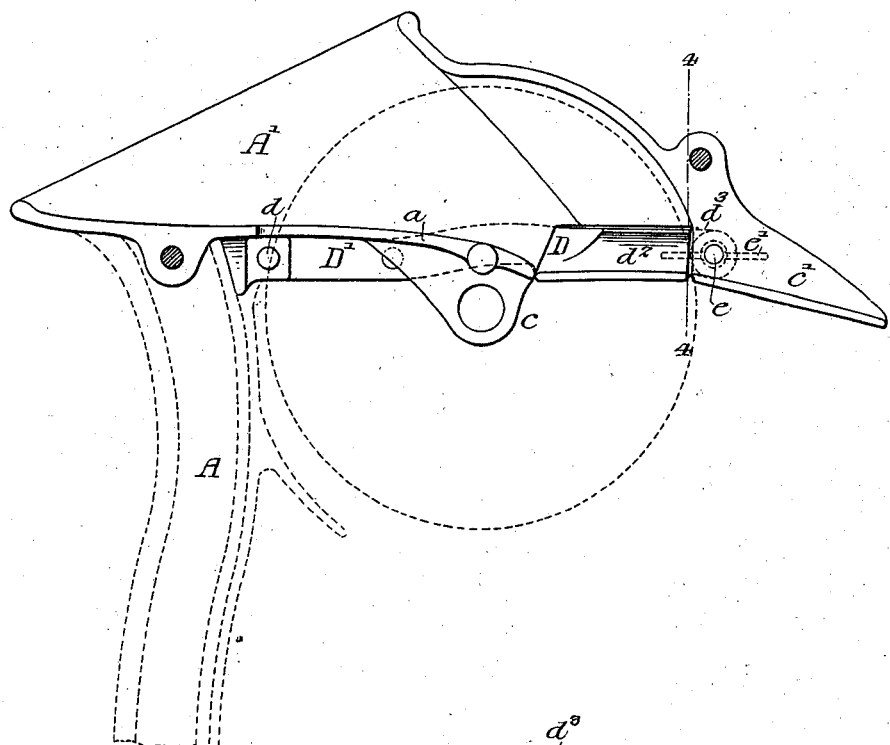
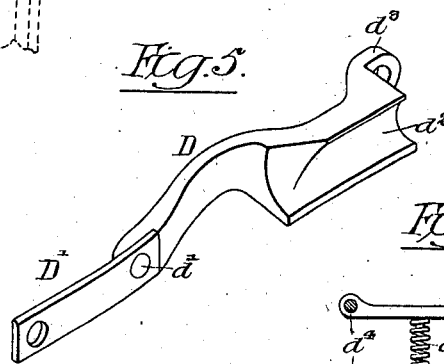
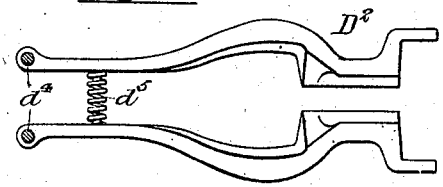
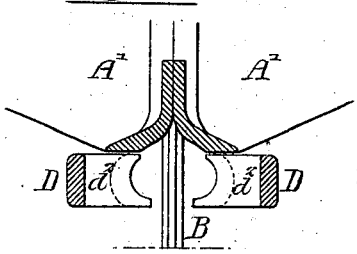
Witnesses:—
Inventor:—
John G. Baker
by his Attorneys:—

UNITED STATES PATENT OFFICE.

JOHN G. BAKER, OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

CHERRY-STONER.

SPECIFICATION forming part of Letters Patent No. 724,241, dated March 31, 1903.

Application filed July 3, 1901. Serial No. 67,021. (No model.)

*To all whom it may concern:*

Be it known that I, JOHN G. BAKER, a citizen of the United States, residing in Philadelphia, Pennsylvania, have invented certain Improvements in Cherry-Stoners, of which the following is a specification.

The object of my invention is to provide means for varying the throat of a cherry-stoner, so that cherries having different-sized stones can be properly fed through the machine. This object I attain in the following manner, reference being had to the accompanying drawings, in which—

Figure 1 is a side view of sufficient of a cherry-stoner to illustrate my invention. Fig. 2 is a sectional plan view on the line 2 2, Fig. 1. Fig. 3 is a longitudinal sectional view on the line 3 3, Fig. 1. Fig. 4 is a transverse sectional view on the line 4 4, Fig. 3. Fig. 5 is a perspective view of one of the adjustable throat-plates, and Fig. 6 is a view of a modification.

A is a standard for supporting the hopper A', which is made in the usual manner. This hopper is slotted at $a$ for the reception of a wheel B, having trunnions $b$ $b$ mounted in bearings $c$ on the frame of the machine. One of the trunnions $b$ has a handle B', by which the wheel B is turned. The wheel has a series of curved ribs $b'$ on each side, as clearly illustrated in Figs. 1 and 2, so as to engage the meat of the cherry.

C is the throat-section of the machine, through which the seeds pass, and $c'$ is the spout, from which the stones drop after being removed from the meat of the cherry. The meat of the cherry is carried down through the slots $a$ $a$ on each side of the wheel B and dropped into a suitable receptacle in the ordinary manner.

Heretofore it has been difficult to adjust the machine to stone different kinds of cherries in which the stones were of different sizes; but by my invention I am enabled to quickly adjust the machine so that cherries of different sizes will be properly stoned.

Secured at $d$ to the frame of the machine is a spring-plate D', secured in turn to a throat-piece D by means of rivets $d'$ in the present instance. This throat-piece is made as shown in Fig. 5 and has a curved projecting portion $d^2$, which enters the throat C of the machine. There is one of these throat-sections D on each side of the machine, as illustrated in Fig. 2, and on each throat-piece is a perforated lug $d^3$, through which passes a stud $e$, screw-threaded and provided with a thumb-nut $e'$, so that by turning the thumb-nuts the throat-pieces can be moved to or from the wheel B.

The spring-section D' is so formed as to tend to force the throat-pieces out against the action of the thumb-nuts. Thus the throat-pieces are always held rigidly in the position to which they are adjusted.

The construction of the pivoted throat-pieces can be varied without departing from my invention, and instead of the spring-plate shown in Fig. 5 the throat-pieces may be made as shown in Fig. 6, in which each throat-piece $D^2$ is made in one piece and pivoted at $d^4$ and separated by a spring $d^5$, although a spring may be used in a similar position to draw the pieces together and nuts may be provided for forcing the pieces apart.

The cherries to be stoned are fed into the hopper A' and the wheel B turned by its crank. The cherries are then drawn into the throat-section C, and the meat is drawn off from the stone, owing to the fact that the opening $a$ in the throat-section is narrower than the diameter of the stone. The stones pass through the throat-piece and out through the spout, while the meat is carried with the wheel and discharged into a suitable receptacle under the machine.

If the cherry-stones are small, the thumb-nuts are adjusted so as to force the throat-pieces toward the wheel; but if the stones are large then the thumb-nuts are adjusted so as to increase the width of the opening and prevent as much as possible the mashing of the meat of the cherry.

I claim as my invention—

1. The combination in a cherry-stoner, of a frame having a hopper and a throat-section, said throat-section being slotted, a wheel extending through the slot, a throat-piece on one side of the wheel, yielding means for moving said throat-piece outwardly, and adjustable means for holding it against such outward movement, substantially as set forth.

2. The combination in a cherry-stoner, of a frame having a hopper and a throat-section, said throat-section being slotted, a ribbed wheel extending into said slot, throat-pieces, yielding means for moving said throat-pieces outwardly, and means for adjusting said throat-pieces and for holding them against outward movement, substantially as described.

3. The combination of a frame having a hopper and a throat-section, said throat-section being slotted, a wheel having trunnions mounted in bearings in the frame, two throat-pieces, each throat-piece having a curved portion extending into the throat of the machine, a spring portion having one end fixed to the machine, studs on the frame extending through lugs on the throat-pieces, and nuts on the studs for adjusting the throat-pieces and holding them against outward pressure of the spring portion, substantially as described.

In testimony whereof I have signed my name to this specification in the presence of two subscribing witnesses.

JOHN G. BAKER.

Witnesses:
WILL. A. BARR,
JOS. H. KLEIN.